(12) United States Patent
Ertl et al.

(10) Patent No.: US 11,248,474 B2
(45) Date of Patent: Feb. 15, 2022

(54) AIRFOIL FOR A TURBOMACHINE

(71) Applicant: MTU Aero Engines AG, Munich (DE)

(72) Inventors: Franz-Joseph Ertl, Munich (DE);
Hans-Peter Hackenberg, Olching (DE); Alexander Buck, Munich (DE); Oskar Ostermeir, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 16/434,385

(22) Filed: Jun. 7, 2019

(65) Prior Publication Data
US 2019/0383148 A1 Dec. 19, 2019

(30) Foreign Application Priority Data
Jun. 14, 2018 (DE) .......................... 102018209610.4

(51) Int. Cl.
*F01D 5/18* (2006.01)
*F01D 5/14* (2006.01)

(52) U.S. Cl.
CPC ............. *F01D 5/187* (2013.01); *F01D 5/141* (2013.01); *F01D 5/147* (2013.01); *F05D 2240/301* (2013.01); *F05D 2250/71* (2013.01); *F05D 2250/713* (2013.01); *F05D 2260/941* (2013.01)

(58) Field of Classification Search
CPC .......... F01D 5/186; F01D 5/187; F01D 5/147; F01D 5/141; F05D 2260/20; F05D 2260/201; F05D 2260/202; F05D 2260/941; F05D 2240/301; F05D 2250/711; F05D 2250/712; F05D 2250/713

USPC ................................................. 416/232, 233
See application file for complete search history.

(56) References Cited

U.S. PATENT DOCUMENTS

| | | | |
|---|---|---|---|
| 3,420,502 | A | 1/1969 | Howald et al. |
| 4,025,226 | A | 5/1977 | Hovan |
| 4,168,938 | A | 9/1979 | Dodd et al. |
| 8,167,573 | B2 | 5/2012 | Merrill |
| 9,863,254 | B2 | 1/2018 | Ceglio et al. |

(Continued)

FOREIGN PATENT DOCUMENTS

| | | |
|---|---|---|
| DE | 2640827 A1 | 4/1977 |
| DE | 102017110050 A1 | 11/2017 |

(Continued)

*Primary Examiner* — Christopher Verdier
(74) *Attorney, Agent, or Firm* — Davidson, Davidson & Kappel, LLC

(57) ABSTRACT

An airfoil for disposition and exposure to flow in a hot gas duct of a turbomachine is provided. The airfoil has a suction-side wall and a pressure-side wall with respect to its exposure to the flow in the gas duct, the side walls converging in an upstream end region toward a leading edge and converging in a downstream end region toward a trailing edge. The airfoil further has a cavity structure therein which is enclosed between an inner wall surface of the suction-side wall and an inner wall surface of the pressure-side wall when viewed in a cross-sectional plane axially parallel to a longitudinal axis of the turbomachine. When viewed in the cross-sectional plane, at least one of the inner wall surfaces, normalized to a mean camber line of the airfoil as a reference, extends with a change in curvature into at least one of the end regions in such a way that a clearance width of the cavity structure is increased at the at least one end region.

15 Claims, 3 Drawing Sheets

(56) References Cited

U.S. PATENT DOCUMENTS

| | | | |
|---|---|---|---|
| 10,301,944 B2 | 5/2019 | Buchholz et al. | |
| 2005/0260076 A1* | 11/2005 | Daux | F01D 5/187 416/97 R |
| 2015/0361801 A1* | 12/2015 | Blaney | F01D 5/18 416/232 |
| 2015/0377045 A1 | 12/2015 | Chang | |
| 2017/0254206 A1 | 9/2017 | Schetzel | |
| 2017/0268345 A1 | 9/2017 | Groves, II et al. | |
| 2017/0328218 A1 | 11/2017 | Leary et al. | |
| 2017/0350255 A1* | 12/2017 | Couture | F01D 5/186 |
| 2017/0361418 A1* | 12/2017 | Twelves | B24C 3/325 |
| 2018/0016915 A1* | 1/2018 | Osborne | F01D 5/141 |
| 2018/0202296 A1 | 7/2018 | Kiener et al. | |
| 2019/0368359 A1* | 12/2019 | Quach | F01D 5/187 |

FOREIGN PATENT DOCUMENTS

| | | |
|---|---|---|
| WO | WO2017005484 A1 | 1/2017 |
| WO | WO2017009051 A1 | 1/2017 |

\* cited by examiner

AIRFOIL FOR A TURBOMACHINE

This claims the benefit of German Patent Application DE 102018209610.4, filed Jun. 14, 2018 which is hereby incorporated by reference herein.

The work leading to this invention was funded in accordance with Grant Agreement no. CSJU-GAM-SAGE-2008-001 in the course of The European Union's Seventh Framework Program (FP7/2007-2013) for The Clean Sky Joint Technology Initiative.

The present invention relates to an airfoil for disposition in the gas duct gas of a turbomachine.

BACKGROUND

The turbomachine may be, for example, a jet engine, such as a turbofan engine. The turbomachine is functionally divided into a compressor, a combustor and a turbine. In the case of the jet engine, for example, intake air is compressed by the compressor and mixed and burned with jet fuel in the downstream combustor. The resulting hot gas, a mixture of combustion gas and air, flows through the downstream turbine and is expanded therein. The turbine typically has a plurality of stages, each including a stator vane ring and a rotor blade ring downstream thereof. In the various stages, a portion of the energy is removed from the hot gas and converted into rotation of the rotor blade rings (this rotation can then be at least partially used, for example, to drive the compressor).

The compressor is typically also made up of a plurality of stages, each including a stator vane ring and a rotor blade ring. As in the case of the turbine, each ring typically has a plurality of airfoils. The airfoil in question is intended to be disposed in the gas duct. It may generally also be disposed in the compressor gas duct as part of the compressor, and during operation, compressor gas, such as intake air in the case of a jet engine, may flow therearound. Preferred is a use in the turbine section; i.e., preferably, the airfoil is disposed in the hot gas duct and exposed to a flow of hot gas therearound. In this connection, prior art has also described cooled airfoils having a cavity structure therein through which a cooling fluid, e.g., compressor air, flows during operation. Like the reference to a jet engine, this is intended to illustrate the present subject matter, but above all not to limit the generality thereof (the airfoil could, for example, alternatively be used in a stationary gas turbine, in place of a jet engine).

SUMMARY OF THE INVENTION

The present invention addresses the technical problem of providing a particularly advantageous airfoil having a cavity structure therein.

The present invention provides an airfoil. More specifically, the innovation relates to the shape of the inner wall surface of the suction-side wall and/or the inner wall surface of the pressure-side wall of the airfoil (the inner wall surfaces together enclose the cavity structure). In accordance with the innovation, when viewed in cross section, at least one of these inner wall surfaces extends with a change in curvature into an upstream end region and/or a downstream end region (the suction-side and pressure-side walls converge in the end regions). The shape of the respective inner wall surface is considered normalized to the mean camber line of the airfoil; i.e., the inherent curvature of the airfoil profile is disregarded (see below for more details).

Based on these considerations, according to the present invention, at least one of these inner wall surfaces extends with a change in curvature into at least one of the end regions. The latter means that, in some regions, the curvature has a different sign than at the end region and before the change in curvature. Geometrically, this means a locally different curvature than at the end region. At the latter region, the inner wall surface is concavely curved, but, due to the change in curvature, it is convexly curved before the end region.

Thus, the inner wall surface is first curved convexly into the cavity (toward the end region), which, on the other hand, results in a corresponding increase in its radius of curvature at the end region (as compared to an inner wall surface without a change in curvature). Due to the change in curvature, the radius of curvature of the inner wall surface bounding the cavity is increased at the end region. This is advantageous from a stress standpoint because it helps reduce the stress concentration in the end region. As an illustration, if the cavity is regarded as a notch, its stress concentration factor (peak stress/nominal stress) is increased by the increased clearance width or the increased radius at the end region, which means that the stress on the material can be correspondingly reduced. The "clearance width" is the open width of the cavity structure, taken between the inner wall surface of the suction-side wall and the inner wall surface of the pressure-side wall, namely perpendicular to the mean camber line in the axially parallel cross-sectional plane. This may be advantageous generally, but particularly in the region of transition to the shrouds (see below for more details).

Preferred embodiments will be apparent from the entire disclosure. In the description of the features, a distinction is not always drawn specifically between device, method and use aspects. In any case, the disclosure should be read to imply all claim categories.

In the context of the present disclosure, "axial" generally relates to the longitudinal axis of the turbine module, and thus to the longitudinal axis of the turbomachine, which coincides, for example, with an axis of rotation of the rotors. "Radial" refers to the radial directions that are perpendicular thereto and point away therefrom; and a "rotation," respectively "rotating" or the "direction of rotation" relate to the rotation about the longitudinal axis. "Circumferential" refers to a circumference about the axis of rotation. The terms "upstream" and "downstream" relate to the flow (of compressor gas or preferably hot gas) around the airfoil in the gas duct; i.e., to the gas flowing along the outer wall surface of the suction-side wall and along the outer wall surface of the pressure-side wall (not to a cooling fluid which may be present in the cavity structure). The outer wall surface of each side wall is opposite the respective inner wall surface, the latter bounding the cavity structure.

The curvature of the suction-side and/or pressure-side inner wall surface(s); i.e., the inner wall surface(s) of the suction-side wall and/or pressure-side wall, is considered in cross section, specifically in an axially parallel cross-sectional plane. This cross-sectional plane is parallel to the longitudinal axis and tangent to a rotation or circumference thereabout (tangent to a cylinder whose axis is the longitudinal axis). As will be illustrated in detail below, the respective inner wall surface generally has a corresponding change in curvature over a certain radial extent, which means that such a change in curvature exists in an arbitrary number of (closely stacked) cross-sectional planes.

As mentioned earlier, the shape of the inner wall surface is considered referenced to the mean camber line of the airfoil; as it were, in an airfoil profile imagined as having been straightened; i.e., one which is not curved. When viewed in cross section, the mean camber line is obtained as a line joining the centers of circles which are drawn in the profile in such a way that they each touch (are tangent to) both outer wall surfaces. An arbitrary number of such circles whose centers describe the mean camber line can be positioned along the profile. Mathematically, the respectively considered inner wall surface is normalized to the mean camber line; i.e., the shape of the respective inner wall surface is defined by the distance from the mean camber line (in each case taken perpendicular to the mean camber line along the length thereof).

The suction-side and/or pressure-side inner wall surface(s) may extend with a change in curvature, namely into the respective upstream and/or downstream end region(s). Thus, there may be a total of, for example, four changes in curvature (suction side/upstream, suction side/downstream, pressure side/upstream, pressure side/downstream) (see below for more details). However, this is not mandatory. It is also possible that a change in curvature may exist in only one of the aforementioned locations or a subset thereof. This may be based, for example, on load profiles determined during the airfoil design process (HCF, LCF, etc.).

In general, the inner wall surface(s) having the change(s) in curvature is/are ideally (an) exposed surface(s); i.e., are not covered by any other component toward the cavity structure or cavity. This idea also manifests itself in that the change in curvature increases the clearance width at the end region. This means, for example, that no baffle plate or the like should be attached by brazing in the inner wall region having the change in curvature. Along these lines, in particular, a raised portion or an inwardly extending projection or the like which merely serves for attachment of another part (e.g., a baffle plate) is not considered herein to be an inner wall surface having a change in curvature. The change in curvature in question is also of interest because it is motivated by stress optimization, and particularly so in the case of an exposed inner wall surface.

In general, in a preferred embodiment, the change in curvature, specifically the inner wall surface in the region of the change in curvature, has a smooth shape when viewed in cross section. Mathematically, this shape is continuously differentiable, and geometrically, it is edgeless. This may be advantageous for example with respect to avoiding a peak stress. The shape should preferably be smooth into and out from the change in curvature; i.e., into the end region, respectively.

In a preferred embodiment, due to the change in curvature, the wall thickness of the suction-side wall and/or pressure-side wall is reduced in this region. When viewed in the aforesaid cross-sectional plane, the wall thickness is taken between the inner wall surface and the outer wall surface (of the respective side wall), namely in directions perpendicular to the outer wall surface. In the region of the respective change in curvature, the wall thickness is then reduced by preferably at least 5% more preferably at least 10%. Advantageous upper limits are no more than 35% and 30%, respectively. In general, the upper and lower limits should also be considered as being disclosed independently of each other. Because the basic idea is to increase the radius of curvature at the end region, the wall thickness is then ideally also reduced into this region, and thus also in the transition between the region of convex curvature (change in curvature) to the concave curvature (end region).

A preferred embodiment relates to the positioning of the change in curvature relative to an extent of the airfoil between the leading and trailing edges, taken along the mean camber line. Specifically, a respective change in curvature is preferably located between the corresponding end region and a midpoint of the airfoil located centrally between the leading edge and the trailing edge as measured along the mean camber line (the distances from the midpoint of the airfoil to the leading edge and the trailing edge along the mean camber line are equal). Thus, in the case of a change in curvature associated with the upstream end region, this change in curvature should be located before or upstream of the midpoint of the airfoil (specifically before a centerline extending perpendicular to the mean camber line through the aforesaid midpoint on the mean camber line). In the case of a change in curvature associated with the downstream end region, this change in curvature is located behind or downstream of the midpoint of the airfoil; i.e., of the aforementioned centerline.

In accordance with a preferred variant, as mentioned earlier, the respective inner wall surface (having the change in curvature) may extend radially over the entire airfoil; i.e., over the entire duct height of the gas duct. In other words, a corresponding inner wall surface exhibits a change in curvature in accordance with the main claim in any axially parallel cross-sectional plane drawn through the airfoil at any radial height (between 0% at the inner shroud and 100% at the outer shroud).

On the other hand, a corresponding design over the entire radial extent is not mandatory since the stress-reducing configuration can also be advantageous when it is present only, or at least also, in highly stressed regions.

Against this background, relative to the duct height of the gas duct (0% at the inner shroud and 100% at the outer shroud), the respective inner wall surface is provided with a corresponding change in curvature at least over a region between 0% and 20% and/or over a region between 80% and 100% of the duct height. Thus, in any axially parallel cross-sectional plane drawn through the airfoil at any height within the specified region(s) (0% to 20% and/or 80% to 100%), the respective inner wall surface exhibits a change in curvature in accordance with the main claim. The positioning at the inner shroud and/or at the outer shroud, preferably in both regions, is advantageous inasmuch as the mechanical loads and the peak stress are particularly high there because of the redirection of forces and, therefore, may limit service life, and, conversely, the advantages of present invention are particularly noticeable there.

In a preferred embodiment, the respective inner wall surface has a change in curvature into the upstream end region and a further change in curvature into the downstream end region. Preferably, the respective inner wall surface (of the suction-side wall or the pressure-side wall) is provided with exactly two changes in curvature; i.e., (normalized to the mean camber line), there is a concave portion in each of the respective end regions, followed by the respective change in curvature (convex) toward the midpoint of the airfoil, and another concave portion in the region of the midpoint of the airfoil.

In a preferred embodiment, both inner wall surfaces; i.e., both the suction-side and pressure-side inner wall surfaces, are each provided with a change in curvature into at least one of the two end regions. This preferably applies to both end regions (see also the remarks made at the outset).

In a preferred embodiment, the cavity structure forms a continuous cavity between the end regions when viewed in cross section. Thus, this cavity extends uninterruptedly between the upstream and downstream end regions. In this respect, the cavity structure should in particular not be a meandering channel having a plurality of radially extending channel sections when viewed from the side (although this is generally possible). The cavity may have a relatively simple geometry, which may be advantageous from a manufacturing standpoint (e.g., with regard to a casting core). In general, the provision of a cavity may not only be motivated to provide for cooling as mentioned at the outset, but in the case of an uncooled airfoil also to obtain weight advantages, for example.

In a preferred embodiment, the cavity structure is continuous between the inner wall surfaces, and thus, there is no discontinuity or the like. Moreover, as discussed earlier herein, ideally no additional elements (baffle plates, etc.) are installed therein.

In a preferred embodiment, the side walls are each in themselves uninterruptedly continuous. This means that the side wall material between the inner and outer wall surfaces of the respective side wall (suction-side wall/pressure-side wall) is free of discontinuities, etc. In particular, it does not contain any voids (hollows).

The present invention also relates to a turbine module having an airfoil as disclosed herein. Preferably, the turbine module has a plurality of such airfoils. These airfoils may preferably also be disposed in different stages or rings.

Furthermore, the invention also relates to the use of an airfoil as disclosed herein or of an aforementioned turbine module in a turbomachine. Preferably, the turbomachine is a jet engine. A possible weight optimization can be particularly noticeable in this case. The use in a turbofan engine may be particularly preferred.

During operation, a cooling fluid, such as, for example, compressor air, may flow through the cavity structure. However, this is generally not mandatory.

BRIEF DESCRIPTION OF THE DRAWINGS

The present invention will now be explained in more detail with reference to an exemplary embodiment. The individual features may also be essential to the invention in other combinations within the scope of the other independent claims, and, as above, no distinction is specifically made between different claim categories In the drawings.

DETAILED DESCRIPTION

Figure 1:
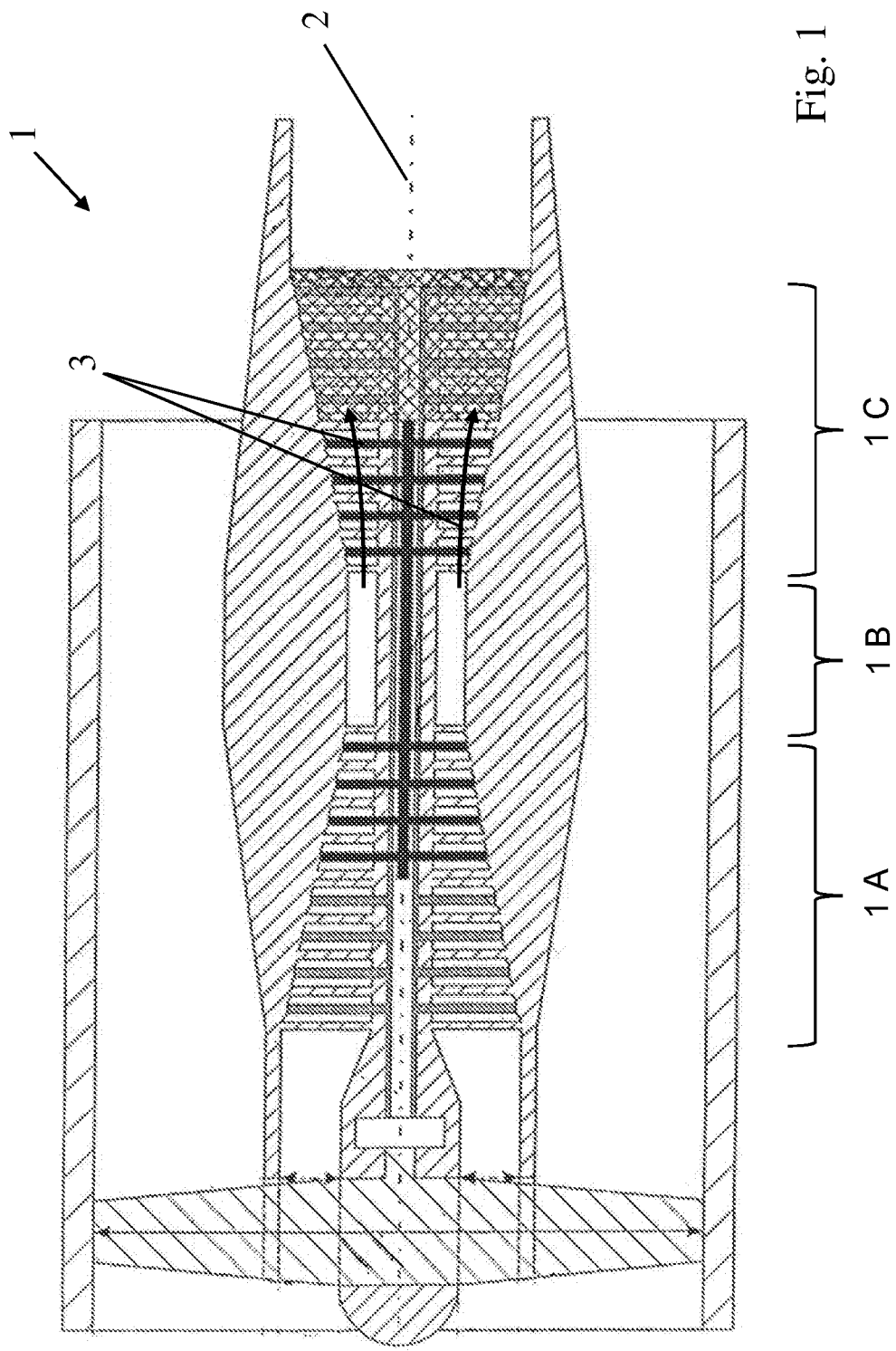
FIG. 1 shows an axial cross-sectional view of a jet engine.

FIG. 1 shows in axial section a turbomachine 1, specifically a turbofan engine. Turbomachine 1 is functionally divided into a compressor 1 A, a combustor 1 B and a turbine 1 C. Both compressor 1 A and turbine 1 C are made up of a plurality of stages, each stage being composed of a stator vane ring and a subsequent rotor blade ring. During operation, the rotor blade rings rotate about longitudinal axis 2 of turbomachine 1. The intake air is compressed in compressor 1 A, and is then mixed and burned with jet fuel in the downstream combustor 1 B. The hot gas flows through hot gas duct 3, thereby driving the rotor blade rings that rotate about longitudinal axis 2.

Figure 2:
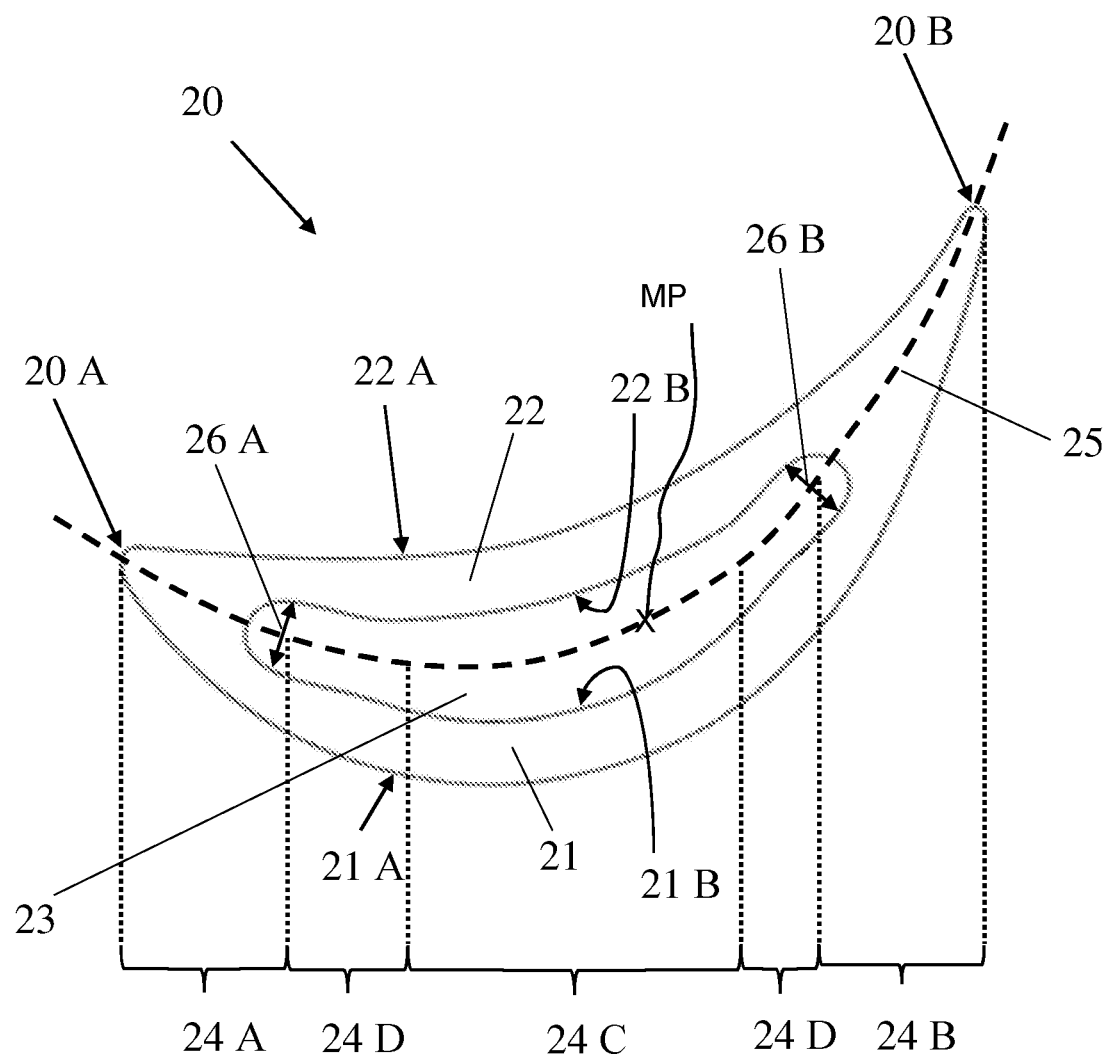
FIG. 2 shows an axially parallel cross section through an airfoil having a change in curvature in accordance with the present invention.

FIG. 2 shows an airfoil 20 of turbomachine 1 of FIG. 1 in cross section, namely in an axially parallel cross-sectional plane. Airfoil 20 has a leading edge 20 A and a trailing edge 20 B and, extending therebetween, a suction-side wall 21 and a pressure-side wall 22 whose outer wall surfaces 21 A, 22 A are exposed during operation to a flow of gas (hot gas) therearound; they form the suction side (21 A) and the pressure side (22 A) of airfoil 20.

The inner wall surfaces 21 B, 22 B opposite the outer wall surfaces 21 A, 22 A of the respective side walls 21, 22 together bound a cavity structure 23 therein, here a continuous cavity. What is special here is the shape of inner wall surfaces 21 B, 22 B. To facilitate discussion thereof, airfoil 20 is divided into a plurality of sections. Specifically, there is an upstream end region 24 A and a downstream end region 24 B. Side walls 21, 22 converge in end regions 24 A, B. Located therebetween is a middle section 24 C including midpoint MP of the airfoil along mean camber line 25. In addition, there are two sections 24 D in which inner wall surfaces 21 B, 22 B each have a curvature with a changed sign, in other words the curvature inverts between concave and convex.

Figure 3:
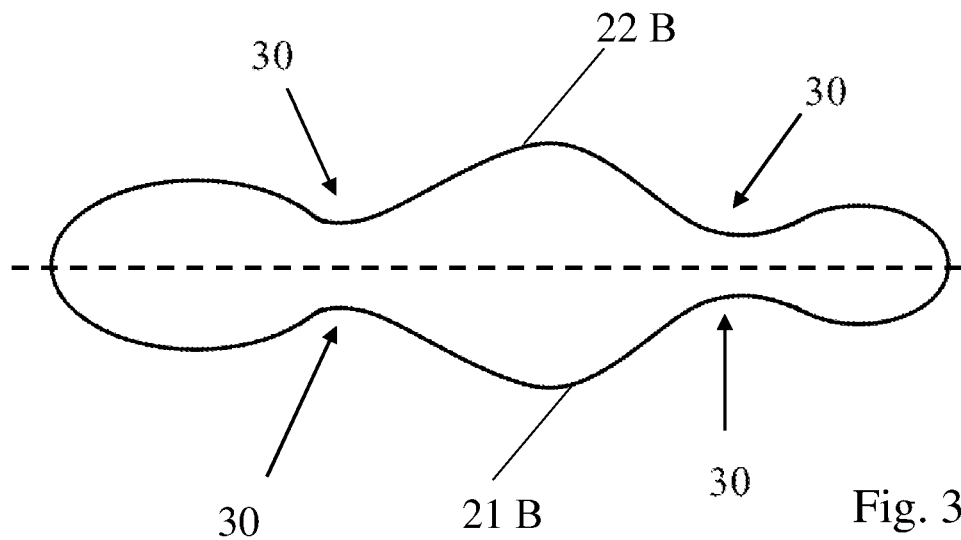
FIG. 3 shows, with reference to FIG. 2, a representation of the inner wall surfaces, referenced to the mean camber line.

In this respect, reference is additionally made to FIG. 3, which shows inner wall surfaces 21 B, 22 B normalized to mean camber line 25 of airfoil 20. The airfoil is (imagined to be) bent straight; i.e., not curved. In this view, there can be seen the changes in curvature 30 with which the suction-side inner wall surface 21 B extends into upstream end region 24 A as well as into downstream end region 24 B. Likewise, pressure-side inner wall surface 22 B extends with respective changes in curvature 30 into upstream end region 24 A and downstream end region 24 B. As a result, a respective clearance width 26 A, B is increased at each of the end regions 24 A, B with respect to extensions 100, 101 meeting at the upstream and downstream end regions.

Figure 4:
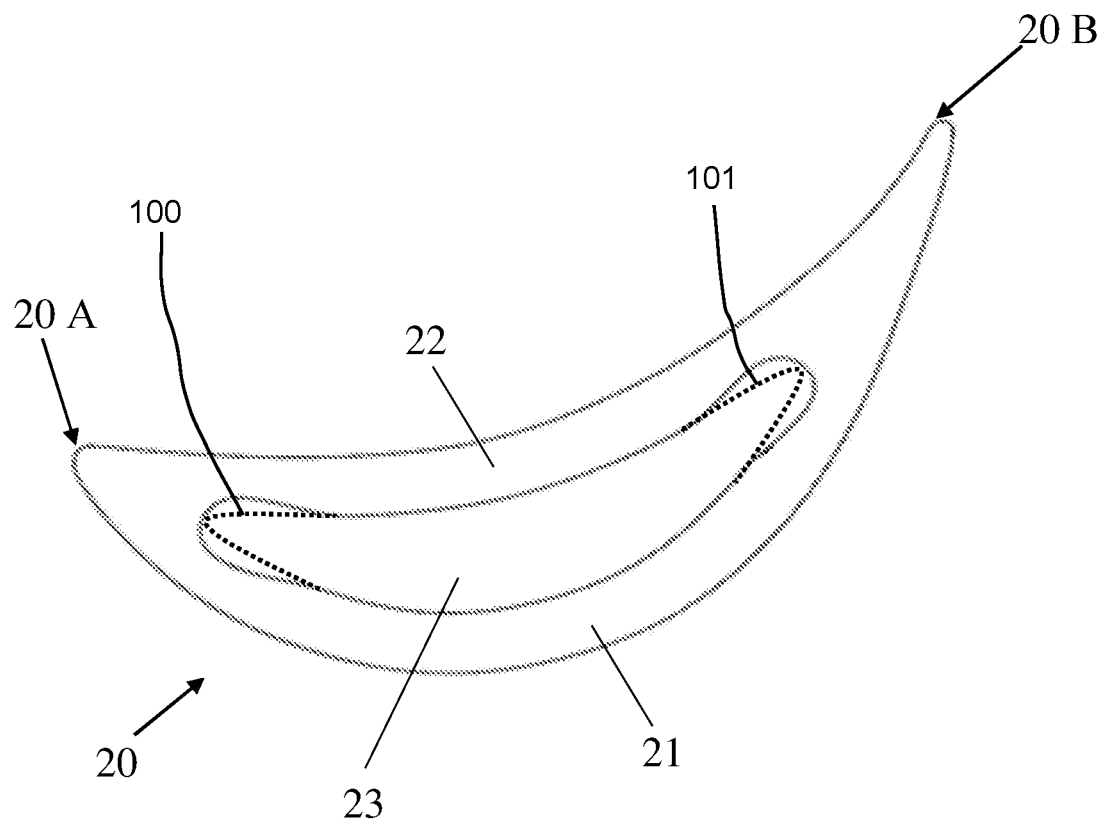
FIG. 4 illustrates, with reference to FIG. 2, an exemplary shape without a change in curvature.

FIG. 4 shows, for purposes of illustration, the same airfoil 20 as FIG. 2, but additionally showing, in broken lines, inner wall surfaces 21 B, 22 B without a change in curvature. This comparison shows that the change in curvature increases the radius of curvature of inner wall surfaces 21 B, 22 B in each of the end regions 24 A, B, which helps reduce the local stress concentration (notch effect) (for details, see also the introductory part of the description).

LIST OF REFERENCE NUMERALS turbomachine 1
compressor 1 A
combustor 1 B
turbine 1 C
longitudinal axis 2
hot gas duct 3
airfoil 20
leading edge 20 A
trailing edge 20 B
suction-side wall 21
outer wall surface (suction side) 21 A
inner wall surface (suction side) 21 B
pressure-side wall 22
outer wall surface (pressure side) 22 A
inner wall surface (pressure side) 22 B
cavity structure 23
upstream end region 24 A
downstream end region 24 B middle section 24 C
sections with a change in curvature 24 D
mean camber line 25
clearance width (at the respective end region) 26 A, B
change in curvature 30
extensions 100, 101
midpoint MP

What is claimed is:

1. An airfoil for disposition and exposure to flow in a hot gas duct of a turbomachine, the airfoil comprising:
   a suction-side wall;
   a pressure-side wall with respect to exposure to the flow in the gas duct, the suction-side wall and pressure-side walls converging in an upstream end region toward a leading edge and converging in a downstream end region toward a trailing edge; and
   a cavity structure enclosed between a first inner wall surface of the suction-side wall and a second inner wall surface of the pressure-side wall when viewed in a cross-sectional plane axially parallel to a longitudinal axis of the turbomachine and having a central section about a mean camber line of the airfoil, the central section including a midpoint of the airfoil located between the leading edge and the trailing edge along the mean camber line, the first and second inner wall surfaces converging in the central section about the mean camber line without a change in curvature in the central section toward the upstream and downstream end regions,
   wherein, when viewed in the cross-sectional plane, at least one of the first and second inner wall surfaces, normalized to the mean camber line of the airfoil as a reference, extends with a change in curvature into both of the upstream and downstream end regions in such a way that a clearance width of the cavity structure in the upstream and downstream end regions is increased at both upstream and downstream end regions with respect to extensions of the first and second inner wall surfaces meeting at the upstream and downstream end regions and wherein the suction-side or pressure-side wall forming the at least one first or second inner wall surface having the change in curvature has a wall thickness in the central section which is reduced by at least 5% and no more than 35% in the region of the change in curvature when viewed in the cross-sectional plane; wherein the at least one of the first and second inner wall surfaces has exactly two changes in curvature.

2. The airfoil as recited in claim 1 wherein the at least one first and second inner wall surfaces has a smooth shape at least in the region of the change in curvature when viewed in the cross-sectional plane.

3. The airfoil as recited in claim 1, wherein, as considered with respect to a duct height of the gas duct, the at least one first or second inner wall surface extends with the change in curvature over an entire duct height.

4. The airfoil as recited in claim 1, wherein, as considered with respect to a duct height of the gas duct, defined between 0% radially inwardly and 100% radially outwardly, the at least one first or second inner wall surface extends with the change in curvature at least over a region between 0% and 20%.

5. The airfoil as recited in claim 1, wherein, as considered with respect to a duct height of the gas duct, defined between 0% radially inwardly and 100% radially outwardly, the at least one first inner wall surface extends with the change in curvature at least over a region between 80% and 100%.

6. The airfoil as recited in claim 1, wherein both the first and second inner wall surfaces extend with a respective change in curvature into at least one of the upstream and downstream end regions.

7. The airfoil as recited in claim 1, wherein the cavity structure forms a continuous cavity between the upstream and downstream end regions when viewed in the cross-sectional plane.

8. The airfoil as recited in claim 1, wherein the cavity structure forms a continuous cavity between the first and second inner wall surfaces when viewed in the cross-sectional plane.

9. The airfoil as recited in claim 1, wherein the suction-side and pressure-side walls are each in themselves uninterruptedly continuous so that side wall material between the first and second inner wall surfaces and a respective outer wall surface is free of discontinuities.

10. A turbine module having an airfoil as recited in claim 1.

11. A method of operating an airfoil as recited in claim 1 in a turbomachine, the method comprising flowing a cooling fluid through the cavity structure during operation of the turbomachine.

12. The method as recited in claim 11 wherein the turbomachine is a jet engine.

13. The airfoil as recited in claim 1, wherein each of the at least one of the first and second inner wall surfaces has exactly two changes in curvature.

14. An airfoil for disposition and exposure to flow in a hot gas duct of a turbomachine, the airfoil comprising:
    a suction-side wall;
    a pressure-side wall with respect to exposure to the flow in the gas duct, the suction-side wall and pressure-side walls converging in an upstream end region toward a leading edge and converging in a downstream end region toward a trailing edge; and
    a cavity structure enclosed between a first inner wall surface of the suction-side wall and a second inner wall surface of the pressure-side wall when viewed in a cross-sectional plane axially parallel to a longitudinal axis of the turbomachine and having a central section about a mean camber line of the airfoil, the central section including a midpoint of the airfoil located between the leading edge and the trailing edge along the mean camber line, the first and second inner wall surfaces converging in the central section about the mean camber line without a change in curvature in the central section toward the upstream and downstream end regions,
    wherein, when viewed in the cross-sectional plane, at least one of the first and second inner wall surfaces, normalized to the mean camber line of the airfoil as a reference, extends with a change in curvature into both of the upstream and downstream end regions in such a way that a clearance width of the cavity structure in the upstream and downstream end regions is increased at both upstream and downstream end regions with respect to extensions of the first and second inner wall surfaces meeting at the upstream and downstream end regions,
    wherein the at least one of the first and second inner wall surfaces has exactly two changes in curvature.

15. The airfoil as recited in claim 14, wherein each of the at least one of the first and second inner wall surfaces has exactly two changes in curvature.

* * * * *